STORAGE CIRCUIT EMPLOYING TUNNEL DIODE, TRANSISTOR AND INPUT TRANSFORMER CONNECTED IN SERIES
Filed June 11, 1964

Inventor:
Charles Antoine Marius David
BY Baldwin & Wight
Attorneys

United States Patent Office 3,300,657
Patented Jan. 24, 1967

3,300,657

STORAGE CIRCUIT EMPLOYING TUNNEL DIODE, TRANSISTOR AND INPUT TRANSFORMER CONNECTED IN SERIES

Charles Antoine Marius David, Paris, France, assignor to Compagnie des Machines Bull (Societe Anonyme), Paris, France Filed June 11, 1964, Ser. No. 374,496
Claims priority, application France, July 18, 1963, 941,835
7 Claims. (Cl. 307—88.5)

The present invention relates to amplifier circuits for processing reading signals obtained from information-storage devices, and more particularly to storage circuit employing tunnel diode, transistor and input transformer connected in series.

The invention is concerned with providing an amplifier circuit having very high performance, which performs in addition functions of amplitude discrimination and storage of reading signals which are applied to its input terminals.

A first object of the invention is to provide such an amplifier circuit which is capable of operating at very high signal frequency, while still being easy to construct and to operate and therefore economical.

A second object of the invention is to provide such an amplifier circuit which has particularly low input impedance.

In the present case, advantage is taken of the high switching rapidity of a tunnel diode and of the presence of two stable states in its operation. It will be recalled that a tunnel diode is a P-N-junction semiconductor element whose current-voltage characteristic curve has a so-called negative resistance region between a low voltage, called the peak voltage, and a high voltage called the valley voltage. In the regions on either side of these voltages, this characteristic curve has a positive slope.

In accordance with the invention, an amplifier for storing very brief pulses applied to its input terminals is composed of a transistor whose base is connected to a fixed potential, or reference point and of which the emitter forms part of the input circuit, as also a tunnel diode connected as a load impedance between the collector of the transistor and the terminal of a voltage source.

An output member sensitive to the voltage is connected in parallel with the tunnel diode, and the secondary winding of an input transformer is connected between the emitter of the transistor and a substantially constant direct-current source, which is so adjusted that in the absence of an input signal the low voltage state of the tunnel diode is maintained by a collector current lower than its so-called "peak" current, and that after reception of an input signal the same collector current is distributed between the said output member and the tunnel diode which has been switched in its high-voltage state as a result of the input signal.

Preferably, the said output member may consist of an amplifier transistor, and more especially by the base-emitter junction of the latter. Of course, appropriate means are provided to return the device to its inoperative state after utilization of the stored signal.

Figure 1:
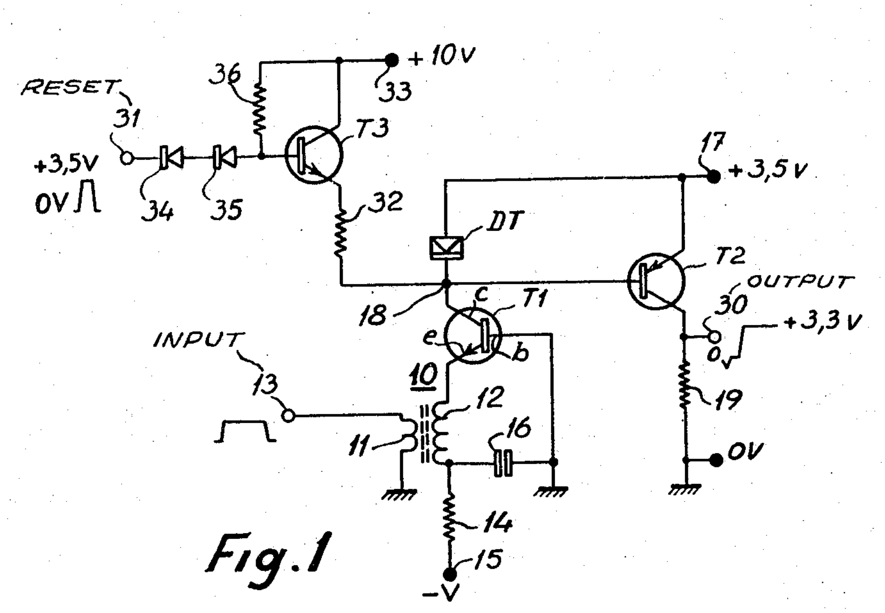
Figure 2:
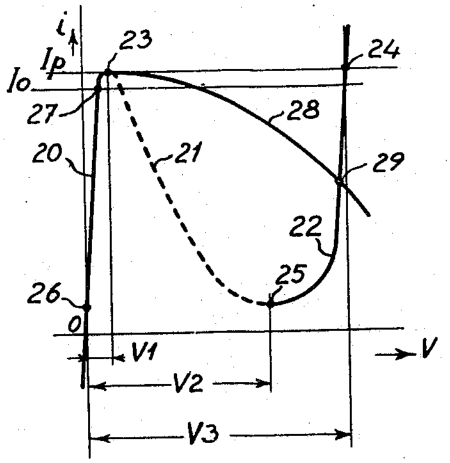

For a better understanding of the invention and the manner in which it may be carried into effect, the same will now be described by way, of example, with reference to the accompanying drawings, in which:

FIGURE 1 is the electric circuit diagram of the storage amplifier completed by an output amplifier and by a return-to-zero device, and FIGURE 2 is the characteristic current-voltage curve of a typical tunnel diode, with the aid of which the operation may be explained.

There exist many applications in which it is desirable to have available a storage amplifier device having a triggering threshold and comprising a very low input impedance with respect to the transient input signals. Moreover, in the information-processing field, it may be necessary for such a device to be able to operate in accordance with a cycle whose duration is of the order of 50 nanoseconds.

The device according to the invention completely meets these requirements while remaining simple and economical.

The storage amplifier illustrated by FIGURE 1 is composed essentially of a transistor T1, of a tunnel diode DT and of an input transformer 10. The latter comprises a primary winding 11, of which one end is connected to the input terminal 13, and a secondary winding 12, of which the upper end is connected to the emitter *e* of the transistor T1, and of which the lower end is connected to a constant-current source. The latter consists in the usual way of a resistor 14 of relatively high resistance, which is in turn connected to a unidirectional-voltage source through the terminal 15, it being assumed that the terminal 15 is connected to the said voltage source (not shown) which may be a battery or a voltage generator fed by the alternating supply system.

The magnetic coupling between the primary winding 11 and the secondary winding 12 is effected by means of a high-frequency ferrite core. The lower end of the secondary winding 12 is connected to earth through the capacitor 16. Since the base *b* of the transistor T1 is directly connected to earth, it will be seen that it is the base which is the electrode common to the input and output circuits. This so-called "common base" or "grounded base" arrangement is more advantageous than the "common emitter" arrangement, because the cut-off frequency $F\alpha$ of the transistor is much higher, while the input impedance is much lower.

The diode DT has its anode connected to the terminal 17, to which a voltage of +3.5 volts is applied, and its cathode connected to the junction point 18 which is in turn connected to the collector *c* of the transistor T1. While the latter does not perform any function in the amplification of the signal, it is the diode DT which simultaneously performs the functions of amplification, amplitude discrimination and storage of the signal received by the device.

The remarkable properties of a tunnel diode, also called an "Esaki diode" will be recalled with reference to the graph of FIGURE 2. For a positive bias, the current/voltage curve of such a diode has a portion 21 (chain-lined) called the "negative resistance" portion, between two portions 20 and 22, called "positive resistance" portions. Generally speaking, a given type of tunnel diode gives a peak current $Ip$ of well-defined value for a voltage V1 at its terminals. The valley voltage V2 will be distinguished, which corresponds to the lower trough of the curve. Finally, the voltage V3 characterizes that at which the current flowing through the diode is equal to the peak voltage. When the voltage across the terminals of the diodes extends from 0 to +V1, it is said that it is in its "low voltage" state, which is stable. When this voltage exceeds V2, the diode is in its second stable state or "high voltage" state. The diode is "triggered" or "switched" when, with increasing current, the operating point suddenly changes from the point 23 to the point 24, or above. If, starting from a voltage of the order of +V3, the current passing through the diode is decreased, the operating point passes through 24, follows the descending portion 22 until the instant when the current reaches the valley point 25 and then suddenly changes to 26, at which the voltage becomes almost zero.

Adverting to FIGURE 1, it is clear that the voltage level difference available at the point 18 is not sufficient to be directly utilized. It is therefore necessary to provide an additional amplification stage, which consists of the transistor T2 and the load resistor 19. The transistor T2 having its base connected to the junction point 18 and its emitter connected to the terminal 17 is therefore used in accordance with the "common emitter" arrangement. The function of the transistor T2 is above all to permit the isolation between the tunnel diode DT and the load represented by way of example by the resistor 19. If the utilization member which the latter represents must be fairly distant from the amplifier, the connection between the collector of T2 and the resistor 19 may be established by means of a matched line or a coaxial cable, of which the characteristic impedance is equal to the value of the resistor 19, i.e. 75 ohms, for example.

By way of example, the elements which may be employed include transistors 2N2475 and 2N976 suitable for T1 and T2 respectively. The first, of the NPN type, must have a high coefficient $\beta$, i.e. one higher than 50, and a gain $x$ frequency of $Ft$ product of the order of 600 megacycles per second. With regard to T2, it is important that this transistor of the PNP-type should be saturable when a relatively low voltage exists between its base and its emitter, since this voltage is that which is determined by the diode DT, i.e. less than 500 millivolts.

The diode DT is advantageously of the germanium type. Its peak current is 10 milliamperes and the voltages V1, V2 and V3 (FIGURE 2) have the values 50, 350 and 500 millivolts respectively. The capacitor 16 may have a value of 0.1 microfarad and the fixed resistor 14 is 1 kilohm, tolerance $\pm 1\%$. With regard to the transformer 10, the windings are constructed on a ferrite core for very high frequencies, of the "Damping Bead 4B" type, which has the form of a rod of very small dimensions. If it is assumed that the impedance of the capacitor 16 is zero with respect to the input signals, the secondary winding 12 of the transformer 10 may be considered as connected in parallel with the emitter-base junction of the transistor T1. Owing to the "grounded base" arrangement, the impedance of this junction is approximately 2.4 ohms, which is already very low. It is known that:

$$Ze1 = Ze2.n^2$$

in which Ze1 is the input impedance seen from the terminals of the primary winding, Ze2 is the impedance connected to the secondary winding, and $n$ is the ratio $N1/N2$ of the numbers of turns of the primary and secondary windings. The ratio n may vary from 0.2:1 to 1:1. The value 0.5 has been chosen for $n$. In this case, the primary winding 11 and the secondary winding 12 comprise 2 and 4 turns respectively. The impedance seen at the input terminals is therefore finally 2.4 ohms x 0.25=0.6 ohm.

The explanation of the operation of the return-to-zero obtained by way of the transistor T3 will be given later. It will be assumed that the device has previously been returned to its inoperative state, in which the current I*o* flowing through the diode DT is slightly lower than the peak current. The operating point 27, FIGURE 2, corresponds to this current I*o*, which is nothing other than the collector current of T1.

The value of this current I*o* must be adjusted with precision since it conditions the discrimination threshold value. In practice, the emitter current of T1 is adjusted by varying the voltage $-V$ applied to the terminal 15. This is the most expeditious solution when it is necessary to adjust the emitter currents simultaneously in a large number of storage amplifiers. In the inoperative state, the potential difference between the base and the emitter of T2 being determined by the diode DT, i.e. of the order of 30 mv., the base current of T2 is substantially zero, and the latter is therefore non-conductive.

The input signal applied to the terminal 13 is a current pulse of a duration of 25 nanoseconds, for example. The increase of the emitter current of T1, which results therefrom, is only one-half of the current in the primary winding by reason of the transformation ratio, but it may be assumed that it rapidly changes the collector current of T1 to 10.5 ma. As soon as the operating point changes from 27 to 23 (FIGURE 2), it is therefore the curve 28 which represents the locus of the operating points of the diode DT during and after the end of the input pulse. The curve 28 results from the parallel connection of the emitter-base junction of the transistor T2.

During the pulse, a state of equilibrium is rapidly reached, this state being represented by the point 29, at the intersection of the curves 22 and 28. The current flowing through the diode DT is then considerably reduced, while the base current derived from T2 is equal to 10.5 ma. less the current in DT. T2 is therefore very rapidly saturated. When the input pulse has ended, the collector current of T1 returns to its previous value, i.e. 9.5 ma. The base current of T2 is thereby reduced by the same quantity, i.e. about 1 ma. less, but it is still sufficient to maintain the saturation of T2, supplying to the load a current of about 40 ma. The storage of the input signal received is manifested by a higher voltage level, approaching $+3.5$ v., available at the output terminal 30.

Before a new cycle can be commenced, the device must be returned to the inoperative state, i.e. returned to zero, if it is assumed that it has previously stored the binary value 1. For this purpose, a positive pulse of a minimum duration of 10 nanoseconds is applied to the terminal 31 by a pulse generator which need not be illustrated since it does not form part of the invention. The transistor T3 connected with the resistor 32 as an "emitter-follower" serves as a switch. The collector of the transistor T3 is connected to a terminal 33, to which a voltage of $+10$ v. is applied. The base of T3 is connected to the terminal 31 through two diodes 34 and 35 connected in series. These are silicon crystal diodes. When such a diode is traversed in the forward direction by an appreciable current, a voltage of 0.7 to 0.8 volt is collected at its terminals. The resistor 36, of 8.2 kilohms, ensures in the inoperative state the passage of a current of about 1 ma. through these diodes, the potential at the terminal 31 being zero at this instant. The essential function of the two diodes 34 and 35 is to ensure economically a shifting of the voltage between the input terminal 31 and the base of T3.

In the absence of a return-to-zero pulse, the voltage of the base of T3 is about $+1.5$ volts, and since the voltage at the junction point 18 can only change between $+3$ and $+3.5$ volts, the transistor T3 is rendered non-conductive. When a return-to-zero pulse is applied to the terminal 31, the voltage at the latter changes to $+3.5$ volts, while the voltage at the base of T3 changes to $+4.9$ volts. It is clear that T3 is rendered conductive. The resistor 32, for example of 68 ohms, is determined in such manner that it supplies to the junction point 18 a current of higher value than the collector current I*o* of T1, previously assumed to be equal to 9.5 ma. The current excess serves first of all to render rapidly non-conductive the emitter-base junction of the transistor T2, so that the voltage at the output terminal 30 returns to zero. In the second place, the voltage across the terminals of the diode DT is cancelled out after its operating point has suddenly changed from from 25 to 26. When the return-to-zero pulse has ended, i.e., when T3 has again become non-conductive, the operating point returns to 27, and the device is again in its inoperative state, and ready to receive a further pulse at the input 13.

It is to be noted that a minimum delay must be observed between the end of the useful signal pulse (terminal 13) and the beginning of the succeeding return-to-zero pulse (terminal 31). This delay may be of 10 to 15 nanoseconds in the constructional example considered in the foregoing. On the other hand, it is quite possible for the stage comprising the transistor T3 to be common to a number of storage amplifiers. It is sufficient for it to be adapted to supply greater blocking currents. It is to be noted in addition that voltage-regulating means are usefully incorporated in the voltage sources supplying the voltages +10 v. and +3.5 v., and above all in that which supplies the voltage —V, which, although adjustable, must be perfectly stabilized.

It has been observed that, in addition to its operation as a bistable element, the tunnel diode DT performs an amplitude-discriminating function with respect to the input signals. It has been seen that the adjustment of the voltage —V at the terminal 15 makes it possible to choose, for example, a threshold current of 0.5 ma. It will be appreciated that if the input of the device receives a parasitic signal, or a reading signal of binary digit O, and that if this signal produces only an increase of 0.3 ma. of the collector current of T1, then the diode DT will not change over, and the state of the storage amplifier will not be modified by this signal. The diode DT performs in addition the function of amplification since the increase in the current which flows through it is temporarily of 1 ma., and the current finally derived from the base of T2 may reach several milliamperes.

The storage amplifier according to the invention is advantageous not only in that it affords a saving of equipment and cost of utilization, but also in that it obviates the transmission delays which are unavoidable when a separate storage stage is disposed after the amplifier stage.

It is obvious that various modifications could be made to the described device without departing from the scope of the invention, notably with a view to employing transistors of opposite types to those indicated in the foregoing description.

I claim:

1. A storage circuit arrangement comprising in combination: voltage source means with two terminals, one of which terminals supplies a reference potential, one transistor with emitter, base and collector electrodes, the base of said transistor being directly connected to said reference potential, a tunnel diode operable in one of two states including a "high voltage" state and a "low voltage" state within a range of currents inferior to its peak current intensity, said diode being conductively connected between the other terminal of said voltage source means and the collector of said transistor, a constant direct-current source, and an input transformer having a secondary winding one terminal of which is connected to the emitter of said transistor and the other terminal of which is connected to said constant current source, whereby the collector current flowing through said tunnel diode is, at rest, lower than the peak current intensity typical of said tunnel diode and an input signal applied to said transformer causes said tunnel diode to trip into its high voltage state of conduction.

2. The combination as claimed in claim 1, further comprising a second transistor of a type opposite to said first mentioned transistor, with its base electrode directly connected to the collector of said first transistor and its emitter electrode connected to the other terminal of said voltage source means.

3. The combination according to claim 1, including pulse generator means connected by a resistor to the collector of said transistor for supplying the latter with a current pulse sufficient to sweep out the current flowing through said tunnel diode when this diode has been set into its high voltage state.

4. A signal storage circuit comprising in combination: a voltage source with first and second terminals, one transistor with emitter, base and collector electrodes, the transistor base being conductively connected to the first terminal of said voltage source, a tunnel diode having anode and cathode electrodes serially connected between the second terminal of said voltage source and the collector of said transistor, the orientation of said diode being such that the latter can assume two stable states of conduction, a resistive and voltage-sensitive element connected in parallel with said tunnel diode, a constant current source, and an input signal transformer having a secodary winding connected between the emitter of said one transistor and said constant current source, in such a manner that an input signal can entail a momentary increase of the emitter current of said transistor.

5. The combination as claimed in claim 4, wherein said resistive element is constituted by the base-emitter junction of a second transistor, the base and emitter of said second transistor being directly connected respectively to the collector of said first transistor and to said second terminal of said voltage source, and further comprising a load impedance connected to the collector of said second transistor.

6. The combination as claimed in claim 4, comprising a current pulse generator device with a resistive element connected to the collector of said transistor, for supplying a current pulse to said transistor when said tunnel diode has been set in its high voltage stable state of conduction.

7. The combination as claimed in claim 4, comprising a capacitor, one plate of which is connected to the junction of said transformer secondary winding with a terminal of said constant current source, and the other plate of which is connected to one of the terminals of said voltage source.

References Cited by the Examiner

RCA Technical Notes RCA TN No. 524, March 1962, "Nanosecond High Current Pulse Circuit," by W. R. Lile.

International Solid-State Circuits Conference (ISSCC), February 1961, "High Speed Tunnel Diode Memory," by Berry and Fisch.

ARTHUR GAUSS, *Primary Examiner.*

J. S. HEYMAN, *Assistant Examiner.*